Feb. 13, 1968  N. KOHEN  3,368,243
VACUUM FORMING APPARATUS
Filed Oct. 22, 1965  2 Sheets-Sheet 2

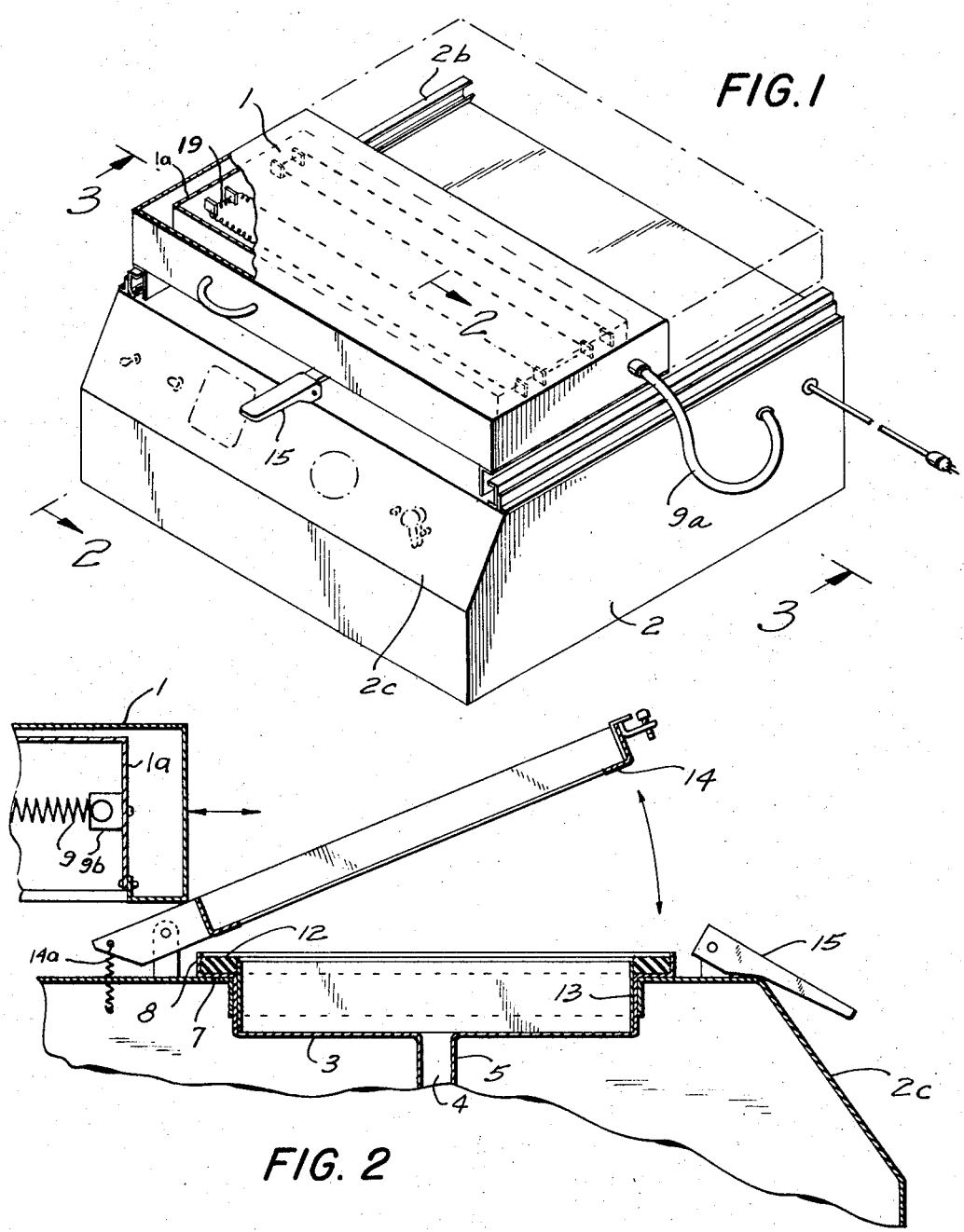

INVENTOR.
NURI KOHEN
BY
Arthur O. Klein
ATTORNEY

United States Patent Office 3,368,243
Patented Feb. 13, 1968

3,368,243
VACUUM FORMING APPARATUS
Nuri Kohen, Jackson Heights, N.Y., assignor to Yardney International Corp., New York, N.Y., a corporation of New York
Filed Oct. 22, 1965, Ser. No. 502,163
10 Claims. (Cl. 18—19)

ABSTRACT OF THE DISCLOSURE

A vacuum-forming apparatus includes a nesting plate having flange means in operative communication with a vacuum source. An unattached gasket is disposed on the flange means extending upwardly from the nesting plate whereby the thermoplastic material is disposed between the angle frame member and the gasket. A coiled Nichrome heating element is horizontally reciprocally mounted to uniformly apply heat to the thermoplastic blank just prior to the application thereto of a vacuum force to thereby insure the desired uniform preselected deformation of the thermoplastic material.

---

The present invention relates to vacuum forming apparatus and is particularly concerned with an improved apparatus for vacuum forming an article from a sheet of thermoplastic material.

The invention relates particularly to the production of plastic signs or other articles and to apparatus by means of which a specific sign may be produced by the subjection of the thermoplastic sheet to heat and suction pressure to cause it to conform to a mold in which it is produced.

The devices known in the art are generally cumbersome, massive, difficult to handle and maintain, and require a skilled attendant. In particular it has been found that the means employed to seal off the interior of the device from the ambient atmosphere are costly to install and frequently malfunction.

Another problem found in such machines lies in properly registering the thermoplastic sheet before the forming process takes place.

It is an object of this invention to provide a simple and practical apparatus for forming sheets of thermoplastic material which is provided with inexpensive and easily replaceable sealing means.

It is another object of this invention to provide a vacuum forming apparatus which includes inexpensive means for aiding to properly register the sheet of thermoplastic material prior to the step of vacuum forming it.

It is still another object of this invention to provide a vacuum forming apparatus which includes inexpensive and improved air distribution and passage means.

For a better understanding of the invention, reference is made to the following description and accompanying drawing in which:

FIGURE 1 is a perspective view of the vacuum forming apparatus of this invention;

FIGURE 2 is a cross-sectional elevation along lines 2—2 of FIGURE 1 with several portions cut away for sake of clarity;

Figure 3:
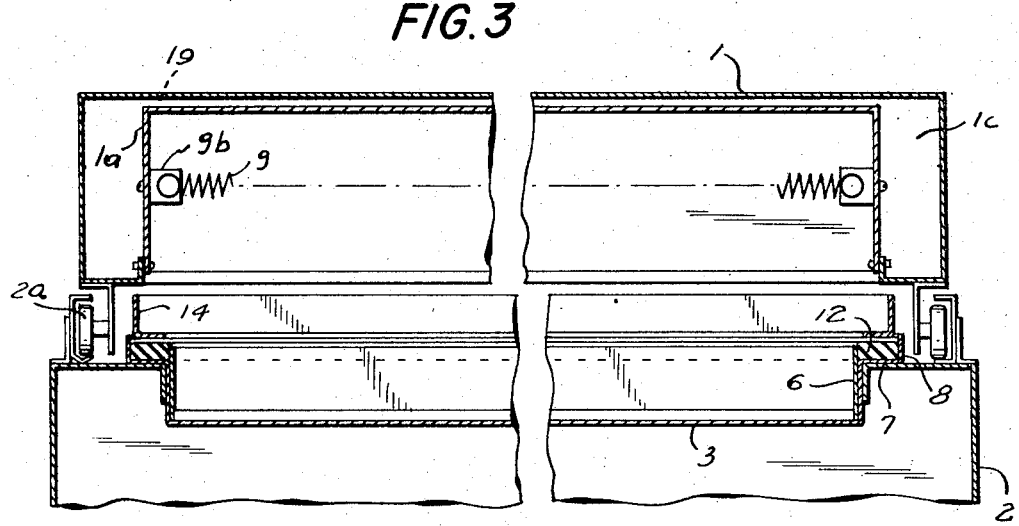
FIGURE 3 is a cross-sectional elevation along lines 3—3 of FIGURE 1.
Figure 4:
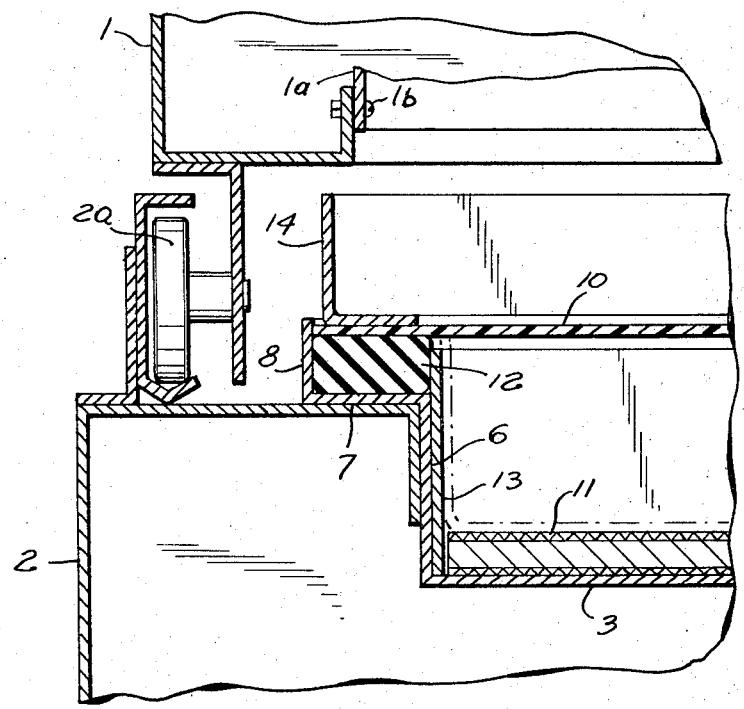
FIGURE 4 is an enlarged detailed elevational view of the sealing and registering means of the apparatus of this invention.

Referring now to the drawing there is illustrated in FIGURE 1 a hollow cover pan 1 made of sheet metal material. Four wheels 2a are rotatably mounted on the pan 1 and are adapted to reciprocably move the pan 1 on a pair of tracks 2b mounted on a base also made of sheet metal. A nesting plate 3 of sheet metal is mounted on the top surface of base 2 adjacent to the instrument panel 2c thereof. The nesting plate 3 is provided at its center with a vacuum opening 4 which is connected by means of a pipe 5 to an electrical vacuum pump (not illustrated). The nesting plate 3 comprises a flange portion consisting of a first vertical member 6, a horizontal wall member 7, and a second outer vertical wall member 8. The nest plate 3 and the members 6, 7 and 8 are integral with each other. The members 6, 7 and 8 can be easily formed out of an originally flat plate of sheet metal due to the relatively elastic character of the latter. An inner wall plate member 13, also preferably made of sheet metal, is secured to the inner surface of the first vertical wall member 6, as per spot welding, and extends slightly above the horizontal support member 7. A gasket member 12, made of rubber or other suitable elastomer material, is mounted on the horizontal support member 7 between the outer wall member 8 and the inner wall plate member 13. The top surface of the gasket member 12 extends slightly above the inner wall plate member 13 and the outer wall member 8, in turn, slightly extends above the top surface of the gasket member 12. It should be noted that since the gasket member 12 is not cemented to its surrounding sheet metal support members, it can be easily removed and replaced after it has become worn by extended use. An angle frame member 14 is pivotally supported on the base 2 over the nesting plate 3 and serves to position and clampingly hold a sheet of thermoplastic material 10 over the nesting plate 3. The angle frame member 14 is spring biased away from the nesting plate 3 by means of a pair of spring members 14a. An electrical Nichrome heating device 19 is mounted inside the hollow cover pan 1 and is connected by means of flexible wire connections 9a to an electric power source. A clamping member 15 is pivotally mounted adjacent to the instrument panel 2c and serves to clampingly hold down a sheet of plastic material 10 between the angle frame member 14 and the gasket member 12.

It is essential that the heating device 19 uniformly heats the sheet of thermoplastic material 10 so that the latter is uniformly deformed when the vacuum pressure is applied thereto. The known heating devices have not rendered completely satisfactory results in this respect. I have, therefore, designed a novel heating device 19 that will more uniformly heat the thermoplastic sheet 10. The heating device 19 comprises a support housing 1a, preferably made of aluminum sheeting that acts as a heat shield and reflector, which is fastened to housing 1 by means of screws 1b in spaced relationship thereto. The air space 1c between the housings 1 and 1a acts as a thermal insulator. A coiled Nichrome heating wire 9 is mounted inside the housing 1a by means of a plurality of ceramic support members 9b. The heating wire 9 is arranged in zig-zag fashion inside the housing 1a in lateral parallel rows. Each pair of adjacent rows is supported by two pairs of oppositely mounted ceramic support members 9b.

A base plate member 11, slightly smaller in area than the nesting plate opening area, is supported inside the nesting plate 3 and is adapted to receive a mold (not illustrated). The thickness of the base plate member 11 determines the depth of the thermoplastic material 10. The base plate member 11 preferably has ridges or protrusions on its top and bottom surfaces which facilitate the passage of air, when the latter is removed by the electric vacuum pump (not illustrated).

The apparatus of this invention operates as follows: The pan 1 is pushed backwards along tracks 2b until the angle frame member 14 is fully exposed. The clamping member 15 is then manually disengaged from the angle frame member 14 and the latter is pivoted upwardly about its support. A flat sheet of thermoplastic material 10 is then placed on top of the gasket member 12 in register with the outer vertical wall member 8. The latter greatly facilitates the proper positioning of the blank 10. The angle frame member 14 is then lowered and pressed over the blank 10 by means of the clamping member 15 so that the gasket member 12, blank 10, and angle frame member 14 form an air tight joint. The pan 1 is then pushed forward and the Nichrome heating device 19 as well as the electric vacuum pump (not illustrated) are respectively connected to an electric power source (not illustrated) by actuating switches on the instrument panel 2c. The thermoplastic blank is then formed inside the nesting plate 3 due to the heat energy emitted by the heating device 19 and the vacuum pressure exerted by the action of the electric vacuum pump (not illustrated).

It should be noted that leakage through the joint formed by the gasket member 12, blank 10 and angle frame member 14 will cause the vacuum forming apparatus to malfunction. It is therefore important, in the event of malfunctioning, to easily replace a worn gasket member 12. This can be accomplished in the device of my invention by merely manually removing the gasket member 12 and replacing with a new one.

Although a preferred example of the invention was described it will be understood that modifications may be made within the spirit and scope of the appended claims.

What I claim is:

1. A vacuum forming apparatus, comprising in combination, a housing having an opening on its top side, a nesting plate adapted to accommodate molding means removably supported thereon, said nesting plate being in operative communication with a source of vacuum, flange means projecting upwardly from said nesting plate, a gasket member having its bottom surface resting on said flange means and adapted to receive a thermoplastic blank on its top surface, a clamping frame operatively mounted on side top side of said housing adjacent to said nesting plate and adapted to clampingly hold said thermoplastic blank over said nesting plate, and heating means reciprocably movably mounted on said top side of said housing, said heating means being adapted to move from a position exposing said nesting plate to a position overlying said nesting plate.

2. A vacuum forming apparatus, comprising in combination, a housing having an opening on its top side, a nesting plate adapted to support a mold removably mounted in said opening, pipe means connecting said nesting plate to vacuum pumping means, U-shaped flange means projecting upwardly from said nesting plate, a gasket member removably mounted in said U-shaped flange means and adapted to receive a thermoplastic blank on its upper free surface, a clamping frame operatively mounted on said top side of said housing adjacent to said nesting plate and adapted to clampingly hold said thermoplastic blank over said nesting plate, and electric heating means reciprocably mounted on said top side of said housing, said heating being adapted to move from a position exposing said nesting plate to an overlying said nesting plate.

3. A vacuum forming apparatus, comprising in combination, a housing having a recess on its top side, said recess having U-shaped flanged side wall means and a bottom wall, said bottom wall being adapted to support molding means, said recess being in communication with a source of vacuum, a nesting plate adapted to accommodate molding means removably supported thereon, a gasket member removably mounted in said U-shaped flange means and adapted to receive a thermoplastic blank on its upper free surface, a clamping frame pivotably mounted on said top side of said housing adjacent to said nesting plate and adapted to clampingly hold in conjunction with said gasket member said thermoplastic blank over said recess, and heating means reciprocably mounted on said top side, said heating means being adapted to move from a position exposing said recess to a position overlying said recess.

4. The vacuum forming apparatus as set forth in claim 2, wherein said U-shaped flange means include an outer vertical leg extending above the top side of said gasket member and an inner vertical leg extending below said top side of said gasket member, said inner vertical leg being attached to said nesting plate.

5. The vacuum forming apparatus as set forth in claim 2, including a base plate member mounted on said nesting plate, said base plate covering substantially all of the area of the bottom wall of said nesting plate.

6. The vacuum forming apparatus as set forth in claim 5, wherein the top and bottom sides of said base plate member have a plurality of ridges projecting therefrom so as to form uneven surfaces which act as air passage means and facilitate the removal of air by said vacuum pumping means.

7. The vacuum forming apparatus as set forth in claim 2, wherein said clamping frame is pivotably mounted on said top side of said housing.

8. The vacuum forming apparatus as set forth in claim 3, wherein said gasket member is of rectangular shape.

9. The vacuum forming apparatus as set forth in claim 1, including flexible electrical wiring means connecting said heating means to said housing.

10. The vacuum forming apparatus as set forth in claim 2, wherein said electric heating means comprise a first housing, a second housing mounted inside said first housing in spaced relationship thereto, and a plurality of parallel rows of an electric heating wire operatively mounted inside said second housing.

References Cited

UNITED STATES PATENTS

| 2,832,094 | 4/1958 | Groth | 18—19 |
| 3,072,964 | 1/1963 | Tilden | 18—19 |
| 3,317,960 | 5/1967 | Kramer | 18—19 |
| 1,765,493 | 10/1956 | Winstead. | |
| 2,814,074 | 11/1957 | Butzko. | |
| 2,926,385 | 3/1960 | Willson. | |
| 3,156,012 | 10/1964 | Hritz. | |
| 3,179,980 | 4/1965 | Ryan et al. | |
| 3,225,387 | 12/1965 | Angelleo et al. | |

FOREIGN PATENTS

| 83,530 | 9/1957 | Denmark. |

WILLIAM J. STEPHENSON, *Primary Examiner.*